United States Patent
Dorian

[15] 3,667,448
[45] June 6, 1972

[54] PORTABLE BRAZIER WITH CLEANING MEANS

[72] Inventor: Jack Dorian, 1196 Vermont Way, San Bruno, Calif. 94066

[22] Filed: Jan. 28, 1971

[21] Appl. No.: 110,718

Related U.S. Application Data

[63] Continuation-in-part of Ser. No. 59,423, July 30, 1970.

[52] U.S. Cl. .........................................................126/25 R
[51] Int. Cl. .........................................A47j 37/00, F24b 3/00
[58] Field of Search ....................126/25 R, 25 A, 25 B, 25 C, 126/9

[56] References Cited

UNITED STATES PATENTS

| | | | |
|---|---|---|---|
| 2,740,395 | 4/1956 | Goodwin | 126/25 A |
| 3,126,881 | 3/1964 | Blotsky, Jr. | 126/25 C |
| 3,209,743 | 10/1965 | Stewart et al | 126/25 B |
| 3,245,398 | 4/1966 | Baker | 126/25 R X |
| 3,369,482 | 2/1968 | Kahn et al. | 126/25 R X |

*Primary Examiner*—Charles J. Myhre
*Attorney*—Flehr, Hohbach, Test, Albritton & Herbert

[57] ABSTRACT

A portable brazier for cooking and barbequing foods. One embodiment of the invention provides a leg-supported bowl provided with a rotatable apertured tray dividing the bowl into upper and lower compartments and adapted to retain the burning coals below a top grill holding the food to be cooked. A scraper blade depends from the tray and is adapted to rotate with the tray for scraping ashes and other residue from the bowl bottom wall into an opening leading to a removable trap. Another embodiment provides a fixed blade with a bowl adapted to turn relative to the blade. A trap in the bowl receives the ashes and other residue scraped from the bowl.

15 Claims, 5 Drawing Figures

INVENTOR
JACK DORIAN
BY Flehr, Hohbach, Test
Albritton & Herbert
ATTORNEYS

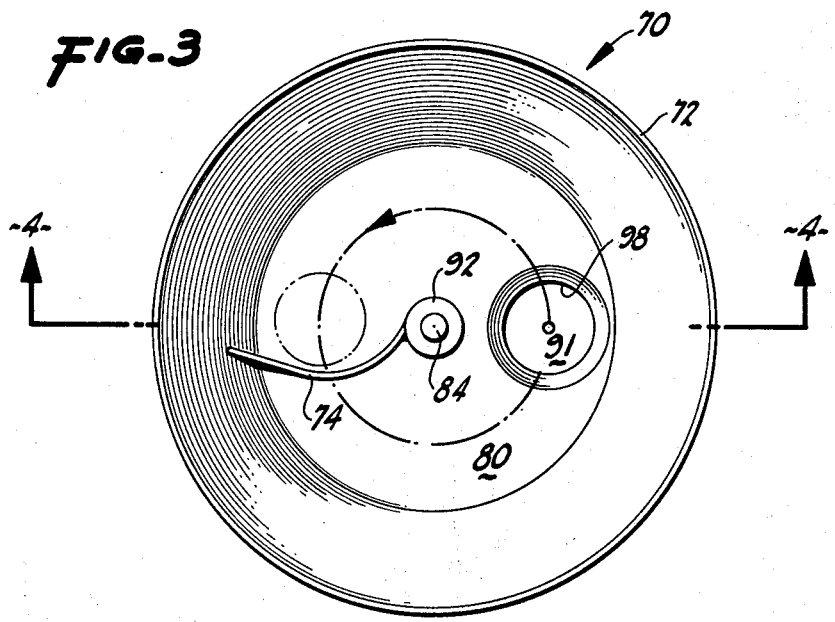
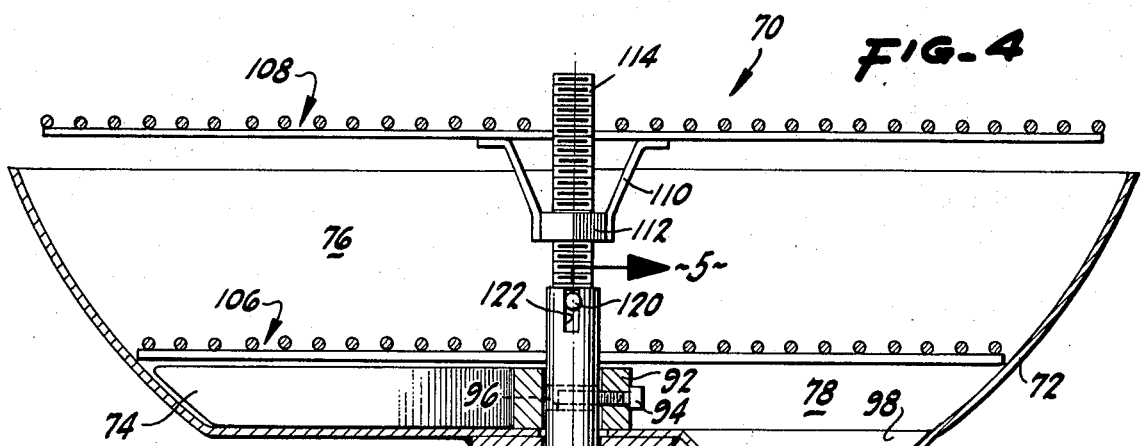
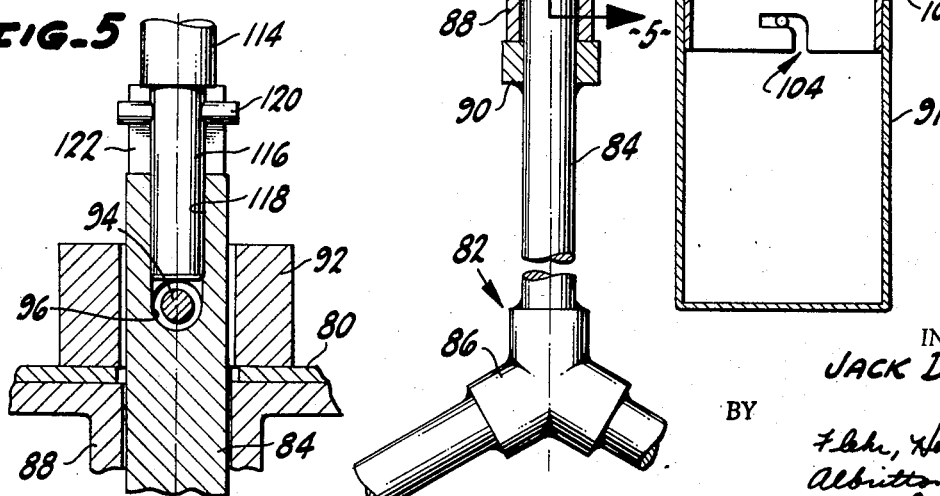

PORTABLE BRAZIER WITH CLEANING MEANS

CROSS-REFERENCE TO RELATED APPLICATION

This application is a continuation-in-part of application Ser. No. 59,423 filed July 30, 1970 by the present applicant.

BACKGROUND OF THE INVENTION

This invention relates to portable braziers for cooking and barbequing foods. Conventional braziers provide a bowl for containing the burning fuels, such as charcoal coals or briquets, with a rotatable and vertically adjustable grill for holding the foods in spaced relationship above the coals. A difficult cleaning problem arises if the coals are placed in direct contact with the bottom surface of the bowl. The ashes from the coals together with food particles and grease which fall through the grill onto the bowl surface create a residue which, after repeated usage, must be cleaned by removing the grill, scraping the bowl surface, and upending the bowl to dump out the residue. This cleaning process is troublesome, inconvenient and an undesirable task. Furthermore, where the coals are placed in direct contact with the bowl surface, air circulation is limited so that a relatively long time is required for burning the coals, and the cooking time is increased. To counter this problem it is known to provide a layer of volcanic rock or the like against the bowl surface with the coals or briquets placed above this rock. The rock protects the bowl surface from the intense heat of the burning coals and at the same time increases air circulation for more rapid burning. However, the ash and grease residue which develops after repeated use fouls the volcanic rock which must eventually be discarded and replaced. Accordingly, the need has been recognized for a brazier of the type described which facilitates cleaning the bowl, and which provides improved burning of the fuel for more rapid cooking.

SUMMARY AND OBJECTS OF THE INVENTION

It is a general object of the invention to provide an improved brazier for cooking and barbequing foods and the like.

Another object is to provide a portable brazier of the type described incorporating means adapted to efficiently clean the ash, grease and other residue from the bottom surface of the bowl.

Another object is to provide an improved brazier of the type described affording improved air circulation for more rapid and complete burning of the coals.

Another object is to provide an improved brazier of the type described incorporating a tray adapted to retain the coals either with or without a layer of insulating rock and with means for scraping the ash and grease residue from the bottom of the bowl into a removable trap.

The foregoing and other objects of the invention are provided in the invention by a brazier comprising a bowl divided into upper and lower compartments by means of an apertured tray spaced below a top grill which holds the food to be cooked. The tray supports the burning fuel with or without an underlying layer of rock. Ashes and grease or food residue drop through the tray into the lower compartment and onto the bottom wall of the bowl. In one embodiment the bowl is fixed and a scraper blade is mounted below the tray to scrape across the bottom wall as the tray is manually rotated for discharging the residue into a trap. The trap is removable for disposing of the residue. In another embodiment the blade is fixed and the bowl is adapted to be rotated so that the blade scrapes the bottom wall for discharging the residue into a trap.

BRIEF DESCRIPTION OF THE DRAWINGS

FIG. 3 is a top fragmentary plan view of another preferred embodiment of the invention;

FIG. 4 is a cross-sectional view taken along the line 4—4 of FIG. 3; and

FIG. 5 is an enlarged sectional view taken along the line 5—5 of FIG. 4.

DESCRIPTION OF THE PREFERRED EMBODIMENT

Figure 1:
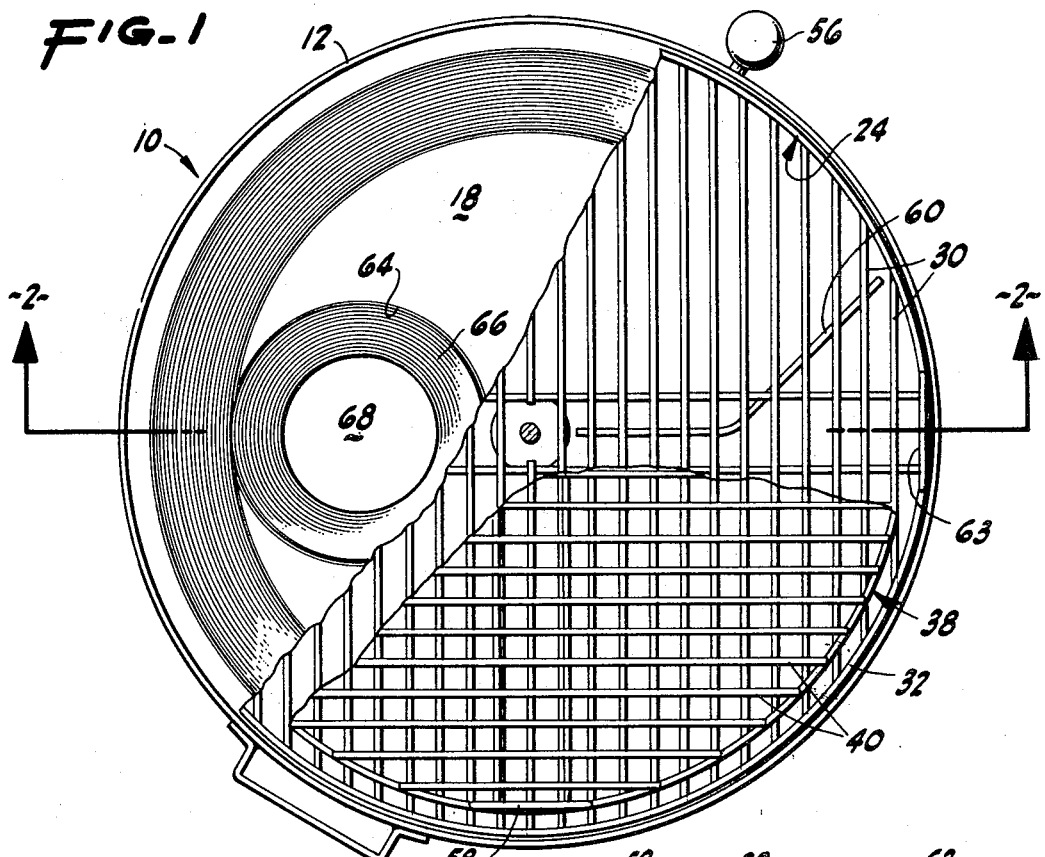
FIG. 1 is a top fragmentary plan view of a brazier according to one preferred embodiment of the invention.
Figure 2:
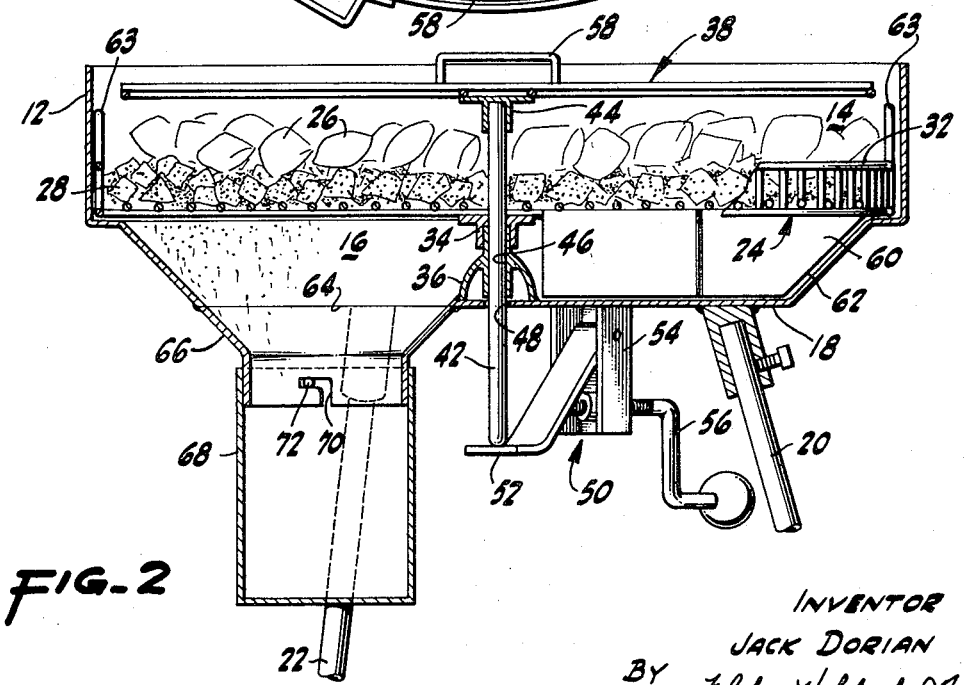
FIG. 2 is a cross-sectional view taken along the line 2—2 of FIG. 1.

In the drawings FIG. 1 illustrates generally at 10 one preferred embodiment of a portable brazier for cooking and barbequing food. Brazier 10 comprises a circular bowl 12 formed into an open-ended upper compartment 14 and a lower compartment 16 enclosed by bottom wall 18. Bowl 12 is supported by means of a plurality of upstanding legs 20, 22 mounted below the bottom wall.

The upper and lower bowl compartments are separated by means of a bottom grill or tray 24 adapted to support the fuel, such as charcoal coals or briquets 26. The bowl wall of the lower compartment may be provided with suitable openings, such as slots, inwardly punched holes, or manually adjustable valves, not shown, to supply air for increased ventilation for burning the fuel. A layer of volcanic rock 28 may be disposed between the tray and coals for a protective insulating layer, and to store or retain the heat energy emitted from the fuel. Tray 24 is constructed in the preferred embodiment by welding together a plurality of stainless steel wires 30 in a reticulated pattern defining apertures or slots of a size small enough to retain the volcanic rock and coals but large enough to pass through the residue of ash, grease and food particles. An annular, upstanding wall 32 of stainless steel wire construction is secured to the outer rim of tray 24 to retain the coals and volcanic rock. Tray 24 is mounted for rotation about a vertical axis by means of central bushing 34 which is removably and rotatably mounted on a domed lift pin guide 36. Lift pin guide 36 in turn is mounted by means such as welding to bottom wall 18.

A top grill 38 for holding the food is constructed of a plurality of stainless steel wires 40 welded together in spaced apart relationship. This grill is releasably mounted in upper compartment 14 in vertically spaced relationship above the tray 24 and the layers of coals and rock. A central lift pin 42 is mounted in depending relationship below the top grill by means of bracket 44. Lift pin 42 extends through a central aperture in tray bushing 34, an aperture 46 in lift pin guide 36, and aperture 48 in bottom wall 18. Top grill 38 is supported for vertical adjustment by means of a conventional lifting mechanism 50. This lifting mechanism comprises a lift tongue 52 pivotally mounted at one end to a U-shaped bracket 54 depending from bowl wall 18. Tongue 52 is adapted to releasably support at its other end the lower end of lift pin 42. A lift crank 56 is threadably mounted in bracket 54 for manual turning adjustment to pivot the lift tongue which in turn raises or lowers grill 38. Grill 38 is completely removed from the bowl for cleaning by lifting on a pair of diametrically positioned lift handles 58 so that lift pin 42 slides freely from the lifting mechanism, bowl and tray.

Residue scraper blade means including a blade element 60 is mounted in depending relationship below tray 24. The blade element could also extend outwardly from tray bushing 34, as desired. Blade 60 comprises a metal plate having a lower edge 62 in closed-space relationship with the inner surface of bowl wall 18. This blade edge is formed with an inclined outer end to conform with the radial contour of the bowl bottom wall. The blade defines an arcuate shape in plan view with its lateral sides diverging forwardly in a direction of tray rotation, for example the illustrated counterclockwise direction, so that the scraping action during rotation of the tray in this direction tends to urge the ash and grease residue toward the center of the blade. At least one handle 63 may be mounted to the tray rim to assist in manual rotation of the tray. An opening 64 is formed in the bowl bottom wall to receive the residue moved across the wall by the scraper blade. While a circular opening is shown, it is understood that a rectangular or square configuration may be provided, as desired. A frusto-conical funnel 66 is mounted below opening 64 with its upper edge flush with bowl bottom wall 18 to afford unimpeded movement of the scraper blade. A removable trap 68 comprising an open-ended container is mounted in material receiving relationship below the open end of funnel 66. A bayonet type mounting arrangement such as the illustrated right-angle funnel slot 70 and cooperating trap pin 72 is provided to permit rapid mounting and dismounting of the trap.

The use and operation of the embodiment of brazier 10 is as follows. With top grill 38 removed a layer of charcoal briquets 26 is deposited on tray 24 and ignited in the usual manner. As desired a layer of volcanic rock 28 may first be deposited on bottom grill 24 with the charcoal briquets in turn deposited over the rock to provide a layer of insulation between the hot coals and the tray wire. Top grill 38 is then positioned by inserting its lift pin 42 through the tray bushing aperture, lift pin guide 36 and bottom wall aperture 48 for support on the lift tongue of lifting mechanism 50. With the desired food distributed over the top grill lift crank 56 is adjusted until the desired vertical spacing of grill 38 with respect to the burning coals is achieved. With the burning coals held above bowl bottom wall 18 air circulation upwardly from the lower compartment is created for faster oxidation of the coals, thus reducing the time required for igniting all coals, increasing the burning temperature, and reducing the cooking time. Where brazier 10 is used without the volcanic rock 28 the residue ashes and grease or food particles will easily fall through the tray apertures onto the bottom surface of bowl wall 18. Where the volcanic rock is used as an insulating layer tray 24 may be knocked or shaken to knock the ash down through the rock from which it then falls through the tray.

After the food is cooked the residue ash, grease and food particles which have fallen onto bowl wall 18 are easily removed by first lifting the top grill 38 free from the brazier. Tray 24 is then manually rotated counterclockwise through handles 63 so that blade 60 moves against and scrapes bowl wall 18. The residue moving ahead of blade 60 is directed by the blade curvature toward its center where it falls through opening 64 as the blade passes over the opening. The residue dropping through the opening is directed into trap 68 by funnel 66. After the trap is filled with ash and other residue it can be easily emptied by manually twisting and unlocking the bayonet connection, dumping the trap, and then locking it in place again. The brazier is now ready for recharging with fresh fuel and replacement of top grill 38 for additional cooking.

FIGS. 3-5 illustrate generally at 70 another preferred embodiment of the brazier invention comprising a circular bowl 72 adapted to turn relative to residue scraper means comprising a fixed blade element 74. In FIG. 3 the brazier is shown with its top grill and lower tray removed for purposes of charity.

Bowl 72 is formed into an open-ended upper compartment 76 and a lower compartment 78 enclosed by bottom wall 80. The bowl is rotatably mounted on a support 82 comprising an upstanding shaft 84 which may be secured to a suitable base frame 86 or mobile support.

A flanged bushing 88 is secured by suitable means such as welding to the bottom of bowl wall 80 in line with a central opening through the bowl. A collar 90 is secured by means such as welding to shaft 84 so that the bowl can be dropped into position by sliding bushing 88 over the end of shaft 84, with the bushing then resting against the upper surface of collar 90 to provide rotatable bearing support for the bowl. Suitable handles, not shown, may be attached to the bowl to facilitate manual rotation.

Scraper blade element 74 comprises a metal plate having a lower edge in close-spaced relationship with the contour of the inner surface of bowl wall 80. As best illustrated in FIG. 3 the blade defines an arcuate shape in plan view with its lateral sides diverging forwardly so that rotation of the bowl scrapes the ash and grease residue towards the center of the blade for removal as trap 91 advances below the blade. The blade element is secured by means such as welding to a collar 92 which in turn is mounted to shaft 84 by means of a bolt 94 extending into a lateral bore 96 formed in the shaft. The diameter of bore 96 is oversize to afford vertical play of the blade element with respect to the shaft to insure that the weight of the blade element maintains contact with bowl bottom wall 80.

A circular opening 98 is formed in bowl bottom wall 80 and a frusto-conical funnel 100 depends from this opening to direct residue into a removable trap 91. This trap comprises an open-ended container lockable to the bowl by means of the bayonet type mounting arrangement 104.

A tray 106 define by a plurality of stainless steel wires welded together rests at its outer periphery against the bowl sidewall above the blade element. This tray defines apertures or slots of a size small enough to retain volcanic rock and coals but large enough to pass through the residue of ash, grease and food particles. The tray is easily lifted from the bowl for cleaning purposes.

A top grill 108 constructed of a plurality of stainless steel wires welded together in spaced-apart relationship is mounted above the bowl for supporting the food above the burning coals. A bracket 110 depends below this grill with a threaded nut 112 secured to the bracket. This nut turns onto a threaded shaft 114 which is formed with a reduced lower end 116 for sliding engagement with a bore 118 formed in the end of shaft 84. A pin 120 is secured to reduce portion 116 and this pin lockably engages with an end slot 122 formed in shaft 84. This affords quick assembly and disassembly of grill 108 onto the end of shaft 84.

The use and operation of the embodiment of brazier 70 is as follows. With top grill 108 removed a layer of charcoal briquets, with or without an underlying layer of volcanic rock, is deposited on tray 106 and ignited. Top grill 108 is then positioned above the coals by inserting the lower end of shaft 114 into the upper end of shaft 84 with pin 120 locking into slot 122. Food is distributed on the top grill which is turned relative to shaft 114 for adjusting the vertical height above the coals. The coals are held above the bowl bottom wall to afford upward air circulation for faster burning and reduced cooking time.

After the food is cooked bowl 72 is turned relative to support 82 so that fixed blade element 74 scrapes the residue ash, grease and food particles from bottom wall 80 into trap 91. When the trap is filled with residue it is emptied by manually twisting and unlocking the bayonet connection.

From the foregoing it is apparent that applicant has provided a new and improved portable brazier. The burning fuel is supported by the tray in spaced relationship above the bowl bottom wall affording increased air circulation for faster and more complete fuel burning and improved cooking. The ash, grease and food particle residue drops through the tray onto the bowl bottom wall from which the residue is easily scraped by merely rotating the tray in one embodiment, or rotating the bowl in the other embodiment. The trap receiving the residue is easily removable for convenient dumping. The cleaning steps thus can be performed without the requirement of tipping over or upsetting the bowl and separately scraping the bottom surface as is presently necessary with a conventional brazier. Where a layer of volcanic rock is utilized as insulation between the coals and tray the ash and other residue falls through this rock for subsequent removal as described without fouling the rock.

While the foregoing embodiments are at present considered to be preferred it will be understood that numerous modifications and variations may be made therein by those skilled in the art and it is intended to cover all such modifications and variations as fall within the spirit and scope of the invention as expressed in the following claims.

I claim:

1. A brazier for cooking foods comprising the combination of an open-ended bowl having a bottom wall, means supporting the bowl with its open-end facing upwardly, a tray mounted in the bowl to separate the bowl into upper and lower compartments, the tray being formed with a plurality of apertures sized to retain fuel elements in the upper compartment and to pass residue particles downwardly into the lower compartment, scraper blade means mounted in the lower compartment and in close-space, scraping relationship with said bowl bottom wall, trap means in the lower compartment to receive and trap residue scraped by the blade means, and a top grill for supporting food, the grill being mounted in spaced relationship above said tray.

2. A brazier as in claim 1 wherein the bowl is mounted for rotation relative to said scraper blade means.

3. A brazier as in claim 2 wherein the means supporting the bowl includes an upstanding shaft, the bowl is formed with a central aperture in which said shaft is slidably received, together with means on the shaft providing rotatable support for the bowl.

4. A brazier as in claim 3 wherein the scraper blade means comprises a blade element secured to said shaft in the lower compartment and constrained therewith whereby rotation of the bowl provides relative scraping movement between the blade element and the bowl.

5. A brazier as in claim 4 including means providing vertical play of the blade element with respect to the shaft to insure scraping contact of the blade element with the bowl.

6. A brazier as in claim 5 wherein the means providing the vertical play comprises means forming a transverse opening through said shaft in the region of the lower compartment and means fixed to the blade element and extending into said slot with vertical clearance therewith.

7. A brazier as in claim 3 wherein the top grill includes a threaded shaft and means releasably mounting the lower end of said threaded shaft with said upstanding shaft, and means mounting the grill to the threaded shaft to afford vertical adjustment of the top grill upon rotation thereof relative to the threaded shaft.

8. A brazier as in claim 1 including means mounting the scraper blade means for rotation with respect to the bowl to scrape the residue into the trap.

9. A brazier as in claim 8 in which the tray is rotatably mounted in the bowl and the scraper blade means comprises a scraper element mounted for rotation with the tray whereby rotation of the tray moves the blade element relative to the bowl for scraping the residue into the trap.

10. A brazier as in claim 9 which includes at least one handle mounted on the tray and extending upwardly therefrom to facilitate manual grasping thereof for rotating the tray and blade means.

11. A brazier as in claim 9 wherein the scraper blade means comprises at least one downwardly projecting, radially extending blade element mounted to the underside of the tray, the blade element having a lower edge disposed in close-spaced relationship with the radial contour of the bowl bottom wall.

12. A brazier as in claim 1 wherein said tray comprises a reticulated grid of wire secured together in spaced relationship to define said apertures, together with an upstanding wall at the outer periphery of said tray for retaining the fuel in the tray.

13. A brazier as in claim 1 wherein said scraper blade means comprises a blade element defining an arcuate plan configuration with its lateral sides diverging forward in the direction of rotation relative to said tray to urge the scraped residue material from the blade element sides toward the blade center.

14. A brazier as in claim 1 wherein the trap means comprises an opening in the bowl bottom wall in registry with the path of relative travel of said blade means together with residue receiving means positioned below said opening.

15. A brazier as in claim 14 wherein said residue receiving means comprises a residue container together with means for releasably locking said container to said bowl bottom wall in material receiving relationship with said opening.

* * * * *